Patented Oct. 24, 1944

2,360,996

UNITED STATES PATENT OFFICE 2,360,996

ANTIRACHITICALLY ACTIVE COMPOUNDS

Adolf Windaus, Gottingen, Germany, assignor to Winthrop Chemical Company, Inc., New York, N. Y., a corporation of New York No Drawing. Application October 12, 1940, Serial No. 360,969. In Germany February 23, 1939

3 Claims. (Cl. 260—397.2)

The provitamins known to-day (ergosterol, 7-dehydrocholesterol, 22-dihydroergosterol, 7-dehydrositosterol, 7-dehydrostigmasterol, ergosterol-$\beta$-oxide) differ from one another only as to the side chain, that is they possess the same ring system with the same steric arrangement of the ring carbon atoms. Especially it may be pointed out that the hydroxyl group has the same steric position to the ring skeleton in all known compounds capable of being activated antirachitically. Furthermore they all have in common the property of being easily precipitated with digitonine and the presence of the two conjugated double bonds in the ring B of the sterol ring system. They all have likewise almost identical absorption spectra. Other sterols cannot be activated antirachitically when not being contaminated by one of the above mentioned provitamins.

Now I have found that antirachitically highly active products are also obtained by exposing to ultra violet light epi-sterols having in the ring B of the ring system two conjugated double bonds in the positions 5, 6 and 7, 8. The irradiation is performed in the usual manner, preferably with exclusion of air in an organic solvent such as benzene, ether, alcohol, cyclohexane, acetic acid ester and the like. As sources for the ultraviolet light there come into consideration mercury vapour lamps, magnesium sparks or other radiators of ultraviolet light. A super-irradiation must be avoided. The products of the irradiation are antirachitically highly active.

The above mentioned epi-sterols differ from the known provitamins only by the steric position of the hydroxyl group. Thus for instance the epi-ergosterol differs from the ergosterol only by the steric position of the hydroxyl group, which is also linked to the carbon atom 3 but on the opposite side of the ring. Owing to this arrangement of the hydroxyl group, the epi-compounds cannot be precipitated with digitonine, which is important for the separation from compounds being precipitable with digitonine.

"Epi-ergosterol" has been described in literature as a crystalline product of the melting point of 152° C. resulting from the reduction of ergosterone. The described product cannot be activated by irradiation with ultraviolet light. After thorough examination it has been found to be a $\Delta^{4,7,22}$-epi-ergostatrien-ol-(3) (Berichte, 71, 1938, pages 576–577), that may be designed also as epi-allo-ergosterol. Therefore the known compound has not the structure to be understood in the usual language by epi-ergosterol. The real epi-ergosterol is also found among the reduction products of the ergosterone and can be enriched by fractionated chromatographical adsorption, for instance, by means of aluminium-oxide, suitably after separation of the parts precipitable with digitonine. Contrary to the aforesaid epi-allo-ergosterol the real epi-ergosterol has the same absorption spectrum between 240 and 300 m$\mu$ as the known provitamins D, so that the most strongly enriched fractions each may be detected by spectrographical methods.

Examples

A 1% solution of epi-ergosterol in benzene is irradiated for one hour in a quartz cylinder with a magnesium spark light. The residue obtained after evaporating the benzene under reduced pressure is antirachitically highly active.

In the same manner the 7-dehydro-epi-cholesterol may be activated by ultraviolet light.

The 7-dehydro-epi-cholesterol is obtained in the following manner:

Oxydation of epi-cholesterylacetate to 7-oxo-epi-chloesterylacetate:

25 grams of epi-cholesterylacetate are dissolved in 250 ccms. of pure acetic acid. A solution of 17.5 grams of chromic acid anhydride in 25 ccms. of a 50% acetic acid is dropped in the course of one hour to this solution held during the oxidation to 50° C. After standing for 3 hours, the excess chromic acid is reduced, the solution concentrated in vacuo and the residue treated with much water. The material insoluble in water is taken up in ether and separated in the usual manner in a neutral and an acid part. The neutral part forms after evaporation of the ether a light yellow, thickly liquid oil. Yield: 18 grams.

This crude oxidation product is recrystallized from boiling methanol. Thereby, 3.8 grams of a by-product are obtained in crystalline form, which is separated by filtration and thrown away. The filtrate is evaporated in vacuo, the residue is dissolved in benzine-benzene and adsorbed on aluminium oxide. An aluminium oxide is employed which was allowed to stand for some time (two weeks) on the open air as acetic acid is split off by freshly glowed aluminium oxide. On eluating the adsorbed material at first some non-converted epi-cholesterylacetate is obtained, then follows in a slightly yellowish zone the 7-oxo-epi-cholesterylacetate and at least in a yellow zone some cholestendione.

The 7-oxo-epi-cholesterylacetate is recrystallized from methanol after evaporation of the benzine-benzene. It forms leaflets of a melting point of 119° C. The absorption spectrum has a maximum at 234 m$\mu$.

Reduction of the 7-oxo-epi-cholesterylacetate:

A solution of 5 grams of 7-oxo-epi-cholesterylacetate and 15 grams of aluminium isopropylate in 500 ccms. of isopropylalcohol is heated to boiling for about 24 hours and the acetone formed and a part of the isopropylalcohol are distilled. Then the solution is treated with 300 ccms. of diluted methylalcoholic potassium hydroxide solution and poured, after standing for one hour in 3 liters of cold water. The precipitated organic substance is then separated by filtration and dissolved in ether. The ethereal solution is dried and evaporated to a small volume. By addition of a low boiling petroleum ether a mixture of two stereoisomeric 7-oxy-epi-cholesterols is obtained. By cooling for several hours with acetone and carbon dioxide the precipitation is completed. The two stereoisomeric compounds differ only by the steric arrangement of the substituents on the carbon atom 7. They are designed as $\alpha$-and $\beta$-7-oxy-epi-cholesterol respectively. The mixture of the two diols represents a white powder being insoluble in petroleum ether. Yield: 4 grams.

4 grams of this material are acetylated at room temperature with pyridine and acetic acid anhydride. After standing for one day, the pyridine and the acetic acid anhydride are distilled in vacuo and the residue is dissolved in benzine-benzene. The solution is subjected to the adsorption on aluminium oxide. By fractional eluating the stereoisomeric forms are separated. The firstly appearing isomer which may be designed as $\alpha$-7-oxy-epi-cholesteryl-diacetate, is not employed for the further experiments. The isomeric compound, which is obtained after the $\alpha$-diacetate and which may be designed as $\beta$-diacetate, is recrystallized from methanol after evaporation of the solvent. Yield: 1.4 grams, colorless needles of the melting point of 145° slightly soluble in chloroform and ether. By saponification of this diacetate the free $\beta$-diol is obtained, crystallizing from aqueous methanol in fine long needles (melting point 173°). The free diol is slightly soluble in methanol and ether, almost insoluble in low boiling petroleum ether. By treatment with pyridine and benzoylchloride the $\beta$-dibenzoate is obtained therefrom as a colorless oil. By dissolving the oil in hot ethanol and cooling the solution with acetone and carbon dioxide a fine white powder is obtained melting not sharp between 70 and 80° C.

Thermic decomposition of the $\beta$-dibenzoate:

The $\beta$-dibenzoate is heated to 195° C. in portions of 50 mgs. in a retort in a high vacuum. After 3 and a half hours the distillation is finished. The benzoic acid is in the cooled receiver, the 7-dehydro-epi-cholesterylbenzoate is found as a tough oil in neck of the retort (yield 30 mgs.). The tough oil is dissolved with pure ether and recrystallized from the pure methanol after evaporation of the ether. When several times recrystallized fine needles of the melting point of 118–119° C. are obtained. Yield 14 mgs.

The monobenzoate is saponified by heating for one hour with 5% methylalcoholic sodium hydroxide solution and the saponification product is isolated in the usual manner. When several times recrystallized fine needles of the melting point of 124–126° C. are obtained. The melting point is not very sharp owing to the content of crystal water. The 7-dehydro-epi-cholesterol is not precipitable with digitomene. It has the same spectrum as 7-dehydrocholesterol.

I claim:

1. A product produced by the ultraviolet irradiation of a 7-dehydro-epi-sterol and characterized by an antirachitic potency comparable to vitamin D.

2. A product produced by the ultraviolet irradiation of epi-ergosterol and characterized by an antirachitic potency comparable to vitamin D.

3. A product produced by the ultraviolet irradiation of 7-dehydro-epi-cholesterol and characterized by an antirachitic potency comparable to vitamin D.

ADOLF WINDAUS.